UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO NATIONAL CARBON COMPANY, INC., OF NEW YORK, N. Y., A CORPORATION OF NEW YORK.

DRY BATTERY.

1,355,899.  Specification of Letters Patent.  Patented Oct. 19, 1920.

No Drawing.  Application filed October 31, 1917. Serial No. 199,423.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Dry Batteries, of which the following is a specification.

This invention relates to a dry battery of the Leclanché type and relates particularly to one prepared with depolarizing material which has previously been used for depolarizing purposes and the invention further relates to what may be termed a reconstructed battery, that is, one made up of materials derived from batteries that have been spent or used up.

Dry batteries of the Leclanché type are made in two sizes, a large or standard type used for electric bell installations, ignition systems and the like, and miniature batteries ordinarily employed for flashlight service. In the former or large type of battery, ordinary mineral manganese dioxid or pyrolusite admixed with graphite is used as the depolarizing mass. In the miniature battery it is customary to use hydrated or artificial manganese dioxid. In both cases the batteries become run down owing to lowering of amperage, which renders them unfit for use long before the materials of the battery have been used or consumed. The output of electrical energy from a battery, considering the quantity of material employed in its construction is very small, there being a great bulk of the components which does not come into play at all and simply adds to the weight of the battery without accomplishing any useful purpose.

In our copending application entitled Reclaiming dry batteries, Serial No. 194,072, we have described methods of treating old batteries to separate their constituents and in the present application we particularly set forth a species of electrical cell which is termed a reconstructed battery. The changes which take place in the battery during storage, discharge, or use and methods and means of securing greater efficiency from the materials employed in the battery construction also are features of the present invention.

It has commonly been supposed that one reason for the dropping off in voltage and amperage of a dry battery is the absorption of water in the battery by electrical action until finally the electrolyte becomes too concentrated or dry to exert proper action. While it is true that spent batteries may be slightly improved by the addition of water, the increase in voltage and amperage is not sufficient to give a satisfactory product. In our many investigations we have observed on breaking down a spent battery, for example, one of the large size, the depolarizing mass adheres in a firm layer to the paper lining which is inserted between the zinc cup and the depolarizing material. A layer of perhaps one-eighth or one-quarter inch thickness of the depolarizing mass often will adhere so firmly to the paper that it appears to be cemented on in some manner, while the depolarizing mass around the central carbon electrode is usually relatively easily pulverized or broken up. On examination of the cemented mass of depolarizing agent clinging to the paper lining it is found that in addition to manganese dioxid and graphite there is present an unusual amount of zinc material. The latter appears to be a compound of zinc chlorid with ammonia or some similar basic or hydrated material containing zinc which is deposited in the outer portion of the depolarizing mass and in the paper lining itself forming a dense layer which ultimately precludes the free passage of the current or diffusion of the electrolyte, or both, and the battery is regarded as spent or useless. This precipitation or deposition of the clogging compound may occur when the battery is in storage and unused on the shelf in stores and the like due to some local action which brings about the production of this precipitate and when the battery is in use the precipitate apparently forms in like manner but much more quickly. Thus a battery which has been discarded will on examination frequently be found to have its zinc electrode but little attacked, very little ammonium chlorid used up, the depolarizing agent but slightly reduced and in fact the discarded battery apparently capable of producing electricity but for some hitherto inexplicable reason not actually capable of giving further service. As stated, this deterioration has been ascribed in some cases to absorption of moisture but our investigations show that moisture absorption does not serve to explain the loss of activity.

Thus a great many batteries are obtained in which the zinc container is substantially intact and the other materials are in good condition with the exception that the battery is clogged by a precipitate or deposit interfering with the free passage of the current or diffusion of the electrolyte, etc. Batteries of this character we particularly make use of in the present invention.

In one form or phase of our invention we may collect batteries of this character which may be opened and the zinc container separated from the depolarizing mass and carbon. The zinc sheet may be melted, and if desired, rolled into a sheet or the zinc ingots obtained by melting may be exchanged for sheet zinc from which fresh containers are prepared. The depolarizing mass may be washed with cold or hot water and if the zinc compound is not removed by such treatment, hydrochloric acid may be used which removes the precipitated material. To regenerate the depolarizing mass it is not however, necessary to wash out the salts and precipitated material to any considerable extent, although in the preferred form of our invention this is done. It is possible to simply take the depolarizing mass and grind it up so as to rearrange the particles, opening the pores again and producing a permeable mass which may be used without further treatment. Preferably as stated, we recommend removal of the soluble salts and also the insoluble zinc material by extraction, the latter preferably with a dilute mineral acid. The depolarizer may have 5 or 10% or even 20% of its manganese dioxid reduced to a lower oxid and it is possible at this point to treat the mass with an oxidizing agent such as sodium hypochlorite, potassium permanganate, and the like, to oxidize to the form of a higher oxid. In this case a new form of depolarizing material is obtained, namely; particles of mineral manganese dioxid having a coating of artificial manganese dioxid on its surface. Such coated particles are present to a greater or less extent in the mass of mineral manganese depending on the amount of reduction which has taken place in the operation of the battery.

Heretofore, we have found that when say only 5 or 10% or so of the manganese dioxid has been reduced it is not necessary to reoxidize but that the depolarizing mass is practically as efficient without any such oxidation as in the reconstructed cell it gives the same voltage and amperage without special oxidation or purification.

In the present case we prefer as stated, to wash the depolarizing mass and after this has been done and the washed material dried, it may be introduced into the fresh zinc container with the old carbon pencil and employing the usual paper or cloth lining or bag and fresh electrolyte may be added. This may be prepared from the salts obtained from the old battery and if zinc chlorid is present in too great an amount in the electrolyte, as found in the old battery, a quantity of ammonium chlorid may be added to yield electrolyte of the proper composition.

In this manner a reconstructed battery is obtained containing the old constituents at a cost substantially less than the cost of producing a battery from entirely new raw materials and the invention herein involves as a new product a reconstructed battery prepared in this manner especially one containing used depolarizer, that is, a depolarizer of mineral or artificial manganese which has already been used in a battery to such an extent that a certain amount of reduction of the manganese dioxid has occurred but not to an extent sufficient to impair the depolarizing effect. For example, the depolarizing material obtained from batteries which have been discarded due to the formation of the insoluble zinc material referred to may be used in many or all cases. While our invention embraces a reconstructed battery of this type, we do not limit ourselves to such form of reconstructed battery but may use depolarizing material of a different character if desired. In the more specific aspect of our invention we contemplate the use of batteries in which electric action has not taken place to such an extent as to practically use up the charge of chemicals but preferably select batteries in which but little action has taken place in the way of discharge of electric energy but wherein the production of the impermeable deposit or membrane or cemented matter in the battery has rendered it useless long before its chemical constituents have been used up in the production of the electric current. The invention, as stated, involves in its preferred or more specific aspect the selection of batteries of this type which are taken apart, the soluble reagents removed, the depolarizing mass cleaned and the materials of the battery put together to give the reconstructed cell, adding to the battery any salts such as ammonium chlorid or any materials which may be requisite to render the battery complete.

In our practical tests we have observed that batteries can thus be reconstructed on the basis of at least ninety new active cells from one hundred old batteries, involving from the standpoint of consumption of raw materials a substantial saving.

One method which may be adopted to increase the life of the battery by reducing the clogging effect of the zinc compound is to have the depolarizing mass of a more porous character at the point of contact with the paper lining. For example, the depolarizing mass may be made of a duplex character, the usual fine material being used in an inner annular layer around the carbon pencil and coarser particles being used next to the paper lining forming a highly pervious or porous outer annular layer. This outer layer may be of coarse particles of manganese dioxid or a mixture of such coarse particles with fragments of graphite or coke or fragments of coke solely may be used in such outer layer and we include in the present invention the construction of a battery of a character having such a porous outer layer of depolarizing or other suitable material, as to prevent rapid deterioration of the battery by clogging thereof through formation of insoluble zinc compounds and we further include herein a battery capable of operating for a considerably longer period of time than a battery of the ordinary type would be expected to render service owing to the fact that the latter would fail through the production of an insoluble impermeable coating in the outer layers of the depolarizing mass or paper lining.

When batteries are constructed in accordance with these considerations it is to be expected that a larger output or longer life may be readily obtained or a battery of less weight may be produced giving the same output as the present type so that the construction of the cells is substantially improved and material savings made in the manufacturing costs.

The purpose of the modification noted above in which greater porosity is given to the outer layers of the depolarizing mass, etc., is to afford space in or between the depolarizer and the lining of the zinc electrode container for the precipitation of the insoluble body without clogging the battery either by preventing the passage of the current through increased resistance or by interfering with the proper diffusion of the electrolyte. The addition of salts or other bodies which ameliorate or prevent the undesirable precipitation of the zinc compound is not precluded. Manganous chlorid of a substantially neutral or slightly basic character may be added to the electrolyte or the depolarizing mass. Similarly a polymerized aldehyde such as paraform or paraldehyde may be present. Trioxymethylene may be used. Formaldehyde and its polymerized products unite with ammonia to liberate water which is useful in the battery as the reactions of the battery during discharge progress and the absorption of the ammonia reduces the tendency of formation of the insoluble battery-clogging material. For example, paraform or paraldehyde may be incorporated with the depolarizing mass especially in the outer layers, or the paper lining may be made up with or impregnated with paraform and the like.

What we claim is:—

1. A dry battery of the Leclanché type in which the formation of an insoluble zinc compound in the course of operation of the battery substantially does not retard for a relatively long period the operation of the battery, said battery having that portion of the depolarizing mass adjacent the zinc container of a relatively porous character.

2. A dry battery of the Leclanché type having a relatively large number of pockets or pores in the depolarizing mass adjacent the zinc container wherein the formation of an insoluble zinc compound may take place in the course of operation of the battery without substantially hindering the operation of the battery for a relatively long period.

3. In a dry battery having carbon and zinc electrodes, a depolarizing mass interposed between said electrodes, the portion of said depolarizing mass adjacent the zinc electrode being of greater porosity than the portion adjacent the carbon electrode.

CARLETON ELLIS.
ALFRED A. WELLS.